Patented June 3, 1930

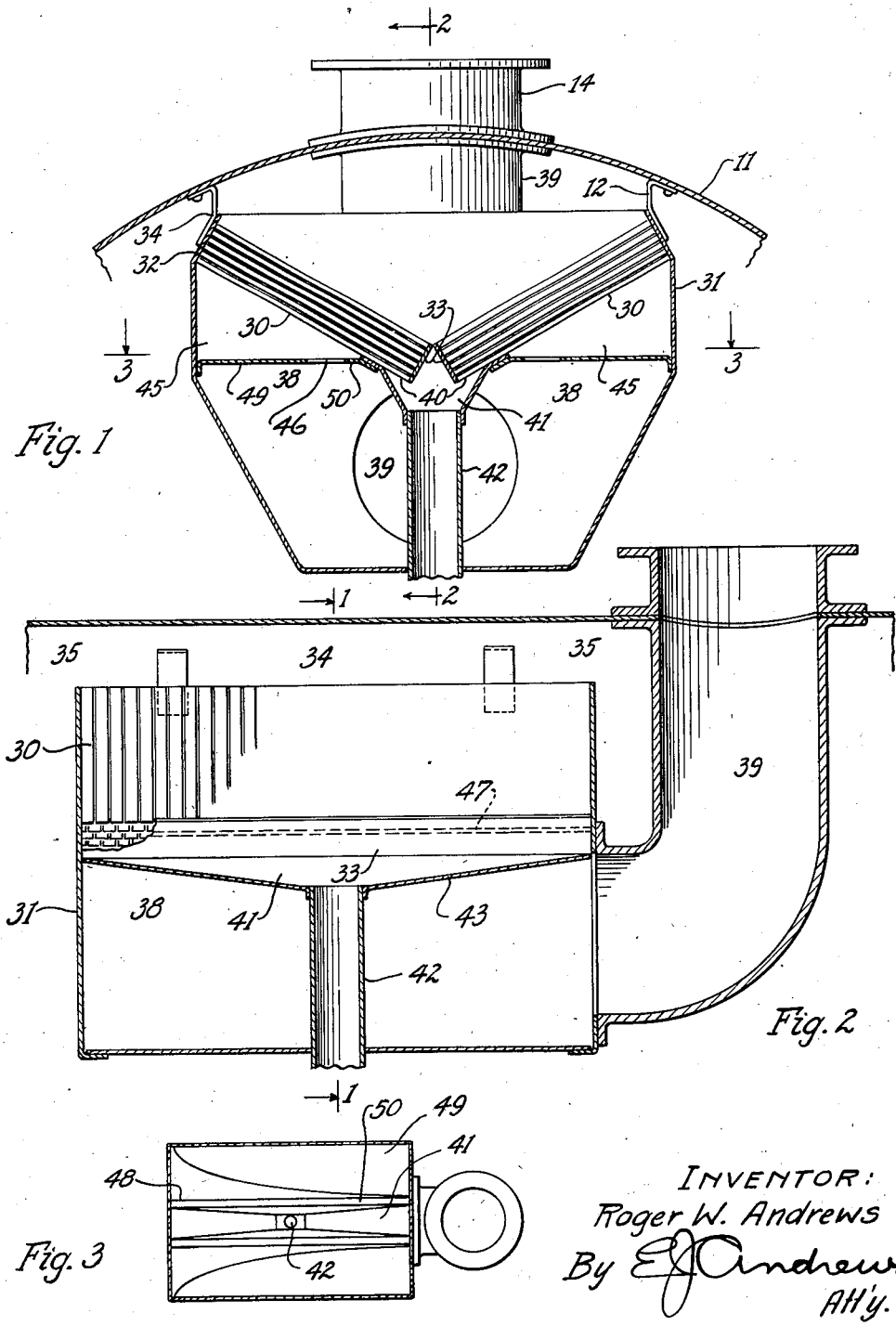

1,761,169

UNITED STATES PATENT OFFICE

ROGER W. ANDREWS, OF PITTSBURGH, PENNSYLVANIA, ASSIGNOR, BY MESNE ASSIGNMENTS, TO BLAW-KNOX COMPANY, OF BLAWNOX, PENNSYLVANIA, A CORPORATION OF NEW JERSEY

FLUID SEPARATOR

Application filed January 27, 1927. Serial No. 163,909.

This invention relates to fluid separators for separating liquids or other impurities from gases. The particular application of the separator, which is illustrated and described in this specification, is to steam boilers for drying and purifying the steam as it passes from the boiler to the steam main; but it is to be understood that the invention applies to various other uses. One of the objects of the invention is to provide a separator the gas inlets of which are located on the upper side of the separator so that the gas, and particularly the steam in case of steam boilers, enters at the upper side and is thus ordinarily drier than steam which enters the separator on the sides. Another object is to provide for proper distribution of the steam through all portions of the purifying baffles of the separator. Other objects of the invention will be seen from a consideration of the accompanying drawings and the following description thereof.

Figure 4:
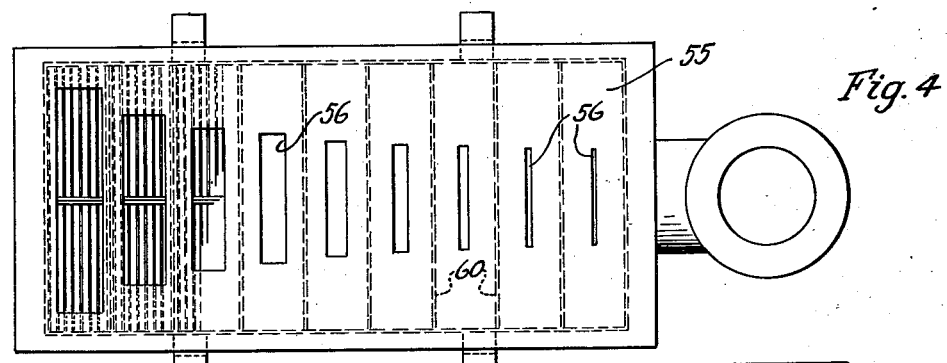
Figure 5:
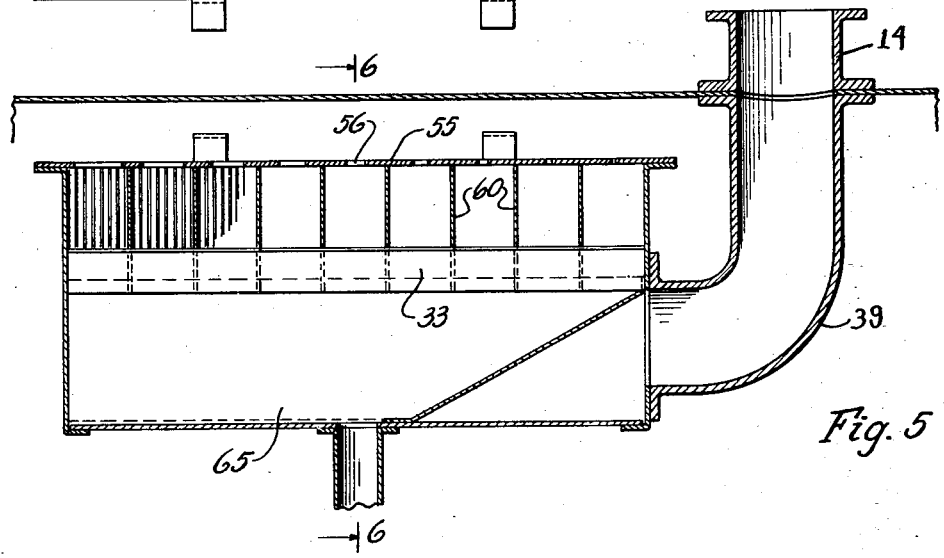
Figure 6:
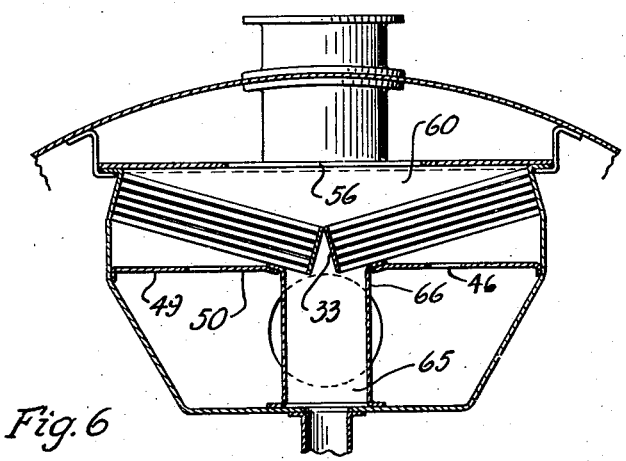

Of the drawings Fig. 1 is a transverse sectional view of a separator mounted in a boiler, which embodies the features of my invention, the section being taken along the line 1—1 of Fig. 2; Fig. 2 is a longitudinal sectional view along the line 2—2 of Fig. 1; Fig. 3 is a reduced sectional view along the line 3—3 of Fig. 1 with the baffles omitted; Fig. 4 is a plan view of a somewhat modified separator alone; Fig. 5 is a longitudinal sectional view of the modified separator; and Fig. 6 is a sectional view of the modified separator along the line 6—6 of Fig. 5.

The separator which I prefer to illustrate my invention comprises a casing 31 which is mounted in any suitable manner in a steam boiler 11. In this instance the casing is supported by hangers 12 in the upper steam space of the boiler. The separator has a steam outlet 39 communicating with the steam main 14 of the boiler system. Within the casing is mounted steam purifying mechanism, such as the baffles 30. These baffles may be of any suitable form; I prefer for the purpose in this instance trough-shaped staggered baffles. These baffles are grouped into cartons or banks, one on each side of the upper side of the separator and with the troughs inclined, downwardly and inwardly, so that, as the steam passes through the baffles, the moisture and other impurities, in a well known manner, are separated from the steam and flow downwardly towards the inner lower ends of the baffles.

The outer and inner ends of the baffles are closed by the respective plates 32 and 33, so that the steam is forced to enter the separator at the side passageways 34 or the end passageways 35, thus passing from the upper portion of the steam space of the boiler where the drier steam is found. In this instance the steam then passes downwardly through the baffles into the chambers 45 and 38 and out of the steam outlet 39 to the steam main 14 of the boiler system outside of the boiler 11. At the same time the moisture and other impurities, separating from the steam, pass inwardly and downwardly along the baffles, and out of the banks of baffles through the outlets 40 into the passageway 41 and thence to the liquid conduit 42, from which they flow out of the separator wherever desired.

In this case the steam is kept entirely separated from the moisture, after it passes through the baffles, by means of the walls 43 of the passageway 41; and the steam passes from the chambers 45 into the chamber 38 through slots 46. The sides of the slots are formed by the edges 47 and 48 of the plates 49 and 50.

I have found it desirable to have the rate of flow of the steam substantially uniform throughout all portions of the baffles. It is, therefore, desirable, in order to provide for this, to maintain the pressure drop substantially uniform through all portions of the baffles. With the separator illustrated herein, as the steam passes to the baffles near the outer ends, it is desirable to have it flow away from the baffles near their inner ends, so as to maintain the pressure drop substantially uniform through all portions. Hence, I locate the slots 46 beneath the baffles but near the inner ends, and thus provide for more uniform flow of the steam through the baffles. It is to be understood, however, that the slots 46 may be placed elsewhere if desired.

As the steam passes out of the separator, in this instance, at one end, the speed of the steam through the baffles at that end ordinarily will be higher than towards the other end of the separator, and, hence, to provide for more uniform flow through the baffles I provide means for retarding the flow more and more as the steam outlet 39 is approached. To this end, in this instance I prefer to make the steam slots or inlets 46 to the passageway 38 tapering, as indicated, with the narrow portion of the inlets adjacent the outlet end of the separator, and with the other end of the inlets substantially the full width of the passageways 45.

In Figs. 4, 5, and 6 I illustrate the separator with some modifications. While the position and form of the slots 46, as hereinabove described, provides for better distribution of the steam flow through the baffles, yet I prefer to provide means for distributing the gas as it enters the baffles 30. In this instance the means which I provide comprise the plate 55 which, except for the openings therein, completely covers the upper portion of the separator. In this plate I provide inlets 56. These inlets may be positioned and shaped, and of relative size, so as to more properly distribute the gas to the baffles, the object being to retard the flow more near the outlet 39 of the separator. To provide for this I prefer to have the openings or inlets near the outlet end much narrower than those towards the other end, and also shorter, so that as the far end is approached the inlets become wider and longer, the outer inlet being very materially longer and larger than the others, as I have discovered that such an arrangement is preferable. It is to be understood, however, that these inlets may be shaped otherwise, and may be uniform in shape if desired, depending upon special conditions, and depending particularly upon the location and shape of the inlets 46 to the passageway 38.

In order to further improve the distribution to the various baffles, and for other reasons, I provide plates 60 which extend downwardly, preferably midway between each pair of adjacent inlets, to the baffles 30, so that the steam entering any particular inlet is confined to the particular baffles which lie beneath the space between adjacent plates 60 and which properly belong to the inlet. However, it is to be understood that these baffles may be dispensed with if desired.

In Figs. 4, 5, and 6, also, I illustrate the separator with a modified form of water conduit. In this case the conduit 42 is replaced by a passageway 65 which is formed by the plates 66 extending downwardly from the plates 50 to the bottom of the casing, thus materially enlarging the passageway and obviating the danger of the passageway being flooded.

I claim as my invention:—

1. A fluid separator comprising an elongated casing, a plurality of elongated baffles mounted in the upper portion of said casing, said baffles extending inwardly and downwardly from the upper portion of one side wall of said casing, a gas chamber in said separator being formed in part by said side wall thereof and the adjacent baffles, a liquid outlet in said separator beneath the inner ends of said baffles, said separator having a gas outlet communicating with said gas chamber, and a partition in said gas chamber between said baffles and said gas outlet extending substantially from one end to the other of the separator, and a slot in said partition extending longitudinally from adjacent one end of the partition to the other.

2. A steam separator comprising a casing, baffles mounted in the upper portion of said casing, said casing having a steam and a water chamber mounted beneath said baffles, said steam chamber being outside of said water chamber, one side of each chamber being formed by said baffles, said casing having a steam outlet and a water outlet, said steam chamber communicating with said steam outlet, said water chamber communicating with said water outlet, and means mounted over said steam chamber for distributing the flow of steam to said baffles, said distributing means comprising means for retarding the steam flow at points near said steam outlet more than at points more remote from said outlet.

3. In a fluid separator two inclined banks of baffles with their lower ends adjacent and their upper ends spaced a material distance apart, each bank having a fluid receiving and a fluid discharging side, the fluid receiving sides facing each other, a wall connected with the outer upper corner of each bank and extending downwardly but spaced from said bank and then extending inwardly towards and connecting with the lower portion of the outer side of said bank, forming a gas receiving chamber along the outer side of said bank, said separator having a gas outlet, and means forming a communication between each gas receiving chamber and said gas outlet.

4. A fluid separator comprising a casing, said casing having a gas outlet, a fluid inlet on its upper side, and a liquid outlet in its bottom, said casing being otherwise closed, gas purifying baffles mounted in said inlet, said baffles comprising elongated troughs, said troughs being inclined downwardly and inwardly, and a gas retarding plate mounted in said separator beneath said baffles, said plate having a gas opening therethrough shaped as an alongated slot.

5. A fluid separator comprising a horizontal elongated casing, said casing being open on its upper side, a plurality of elongated baffles extending from the central portion of said casing in opposite directions and slanting upwardly and outwardly, the side walls of said casing forming with said baffles a gas chamber in said casing along said baffles and extending from one end to the other of the casing on each side of the casing, a gas outlet fixed to one end of said casing and communicating with one end of each of said chambers, a water chamber beneath the inner ends of said baffles between said gas chambers, and a liquid outlet projecting from the lower side of said casing and communicating with said water chamber.

6. A steam separator comprising a casing having a steam outlet and a liquid outlet, and a steam inlet, said inlet being positioned in the top of said casing, a bank of baffles on each side of said inlet having its upper end mounted in the upper portion of said casing, each of the said banks extending downwardly and inwardly with the lower inner ends of the banks adjacent each other, a water chamber beneath the lower ends of said baffles, said chamber communicating with said liquid outlet, and a steam chamber extending along the lower side of each of said banks formed by said casing and banks, each of said steam chambers communicating with said steam outlet but being otherwise independent of the other steam chamber.

7. A gas separator comprising a casing having a gas outlet, two banks of baffles mounted in said casing, each of said banks having gas inlets on one side, and having gas outlets on the opposite side, the inlets of said banks facing towards each other, the lower ends of said banks being adjacent each other, and the other ends being spaced apart, said casing and each of said banks forming a gas chamber along the outlet side of each bank and a common water chamber beneath the adjacent bank ends, said water chamber having a water outlet and each of said gas chambers having a gas outlet communicating with said casing outlet, said gas chambers being otherwise entirely separated and without any communicating means.

8. A gas separator comprising a casing, two banks of baffles mounted in said casing, each of said banks having gas inlets on one side, and having gas outlets on the opposite side, the inlets of said banks facing towards each other, the lower ends of said banks being adjacent each other, and the other ends being spaced apart, said casing and each of said banks forming a gas chamber along the outlet side of each bank, and a common water chamber positioned beneath the adjacent bank ends, said water chamber having a water outlet, and each of said gas chambers having a gas outlet, said water chamber comprising two partitions, one extending downwardly from adjacent the lower end of the outlet side of each of said banks, said water outlet being connected to said water chamber adjacent the lower edges of said partitions.

9. A fluid separator comprising two inclined banks of baffles, each bank adapted to receive on one side fluid for purification and to discharge it on the other side, the lower ends of the banks being adjacent and the upper ends being materially spaced, with the fluid receiving sides facing each other, walls associated with the discharging side of each bank and forming a gas chamber with said bank, said gas chambers being disconnected from each other, walls mounted beneath the lower ends of said banks and forming a common water chamber with said banks, said gas chambers being spaced apart the width of said water chamber, each of said chambers having an outlet.

10. In a fluid separator having a gas outlet, two vertically inclined banks of baffles positioned with their lower ends adjacent, each bank having a fluid receiving side and a fluid discharging side, retaining walls forming with said lower ends a liquid receiving chamber, and plates forming with the outlet side of each bank a gas receiving chamber, each of said gas chambers having an outlet communicating with said separator outlet, a plate closing the upper end of each bank of baffles, the lower portion of said baffles adapted to discharge liquid directly into said liquid chamber and gas directly into the adjacent gas chamber.

11. In a fluid separator two vertically inclined banks of baffles positioned with their lower ends adjacent, each bank having a fluid receiving side and a fluid discharging side, retaining walls forming with said lower ends a liquid receiving chamber, and plates forming with the inner side of each bank a gas receiving chamber, each of said chambers having an outlet opening, the outlet openings of said gas chambers communicating with each other, but said gas chambers otherwise being entirely separated from each other, and a plate closing the lower end of each of said banks of baffles.

12. A fluid separator comprising two banks of baffles inclined in opposite directions away from a vertical plane, with their fluid receiving sides facing said plane, said separator having a gas outlet and a liquid outlet, means for directing gas from each of said banks into said gas outlet, and means for directing liquid into said liquid outlet, gas retarding means being mounted in said gas directing means, said retarding means arranged to retard the flow of gas adjacent the gas outlet more than at more remote points.

13. A fluid separator comprising two inclined banks of baffles, each bank having fluid inlets on one side, and fluid outlets on the other side, the lower ends of the banks being adjacent and the upper ends being materially spaced, with the fluid inlet sides adjacent, walls mounted on the outlet side of each bank and forming a gas chamber with said banks, and walls mounted beneath the lower ends of said banks and forming with said lower ends a water chamber.

14. A steam separator comprising a casing, baffles mounted in the upper portion of said casing, said casing having a steam and a water chamber mounted beneath said baffles, one side of each chamber being formed by said baffles, said casing having a steam outlet and a water outlet, said steam chamber communicating with said steam outlet, said water chamber communicating with said water outlet, and means mounted over said steam chamber for distributing the flow of steam to said baffles, said distributing means comprising means for retarding the flow of steam into said baffles at points adjacent to the outlet more than at points remote from the outlet.

In testimony whereof, I hereunto set my hand.

ROGER W. ANDREWS.